United States Patent [19]

Kagan

[11] Patent Number: 5,641,340

[45] Date of Patent: Jun. 24, 1997

[54] METHOD FOR FILTERING AIR IN LAMINAR FLOW

[76] Inventor: Anton Kagan, 134 Bowden St., Lowell, Mass. 01852

[21] Appl. No.: 517,200

[22] Filed: Aug. 18, 1995

Related U.S. Application Data

[63] Continuation-in-part of Ser. No. 136,234, Oct. 15, 1993, abandoned.

[51] Int. Cl.[6] .................................................. B01D 46/00
[52] U.S. Cl. .......................... 95/273; 55/385.1; 55/385.2; 55/467; 55/473; 55/490; 55/509; 95/286
[58] Field of Search ............................. 95/273, 286, 287; 55/279, 385.1, 385.2, 385.6, 467, 471, 472, 473, 490, 509, 496

[56] References Cited

U.S. PATENT DOCUMENTS

| | | | |
|---|---|---|---|
| 2,161,027 | 6/1939 | Dollinger | 55/471 |
| 2,313,676 | 3/1943 | Shaver | 55/471 |
| 2,883,790 | 4/1959 | Blackman | 55/471 |
| 3,369,348 | 2/1968 | Davis | 55/473 |
| 3,477,211 | 11/1969 | Pietsch | 55/472 |
| 3,846,072 | 11/1974 | Patterson | 55/279 |
| 4,477,272 | 10/1984 | Hollis et al. | 55/471 |
| 4,560,395 | 12/1985 | Davis | 55/473 |
| 4,750,863 | 6/1988 | Scoggins | 55/471 |
| 4,889,542 | 12/1989 | Hayes | 55/471 |
| 5,039,316 | 8/1991 | Hunter et al. | 55/467 |

Primary Examiner—C. Scott Bushey

[57] ABSTRACT

The invention provides a method of filtering air within an enclosed space which includes the combination of a fan and air filtration media, which is positioned relative to the fan so as to avoid aerodynamic and mechanical vibrations within the filter media. The filter is positioned relative to the fan such that the airflow passing through the filter will be within the laminar regime. The filter is connected to the fan or to a structural element within the enclosed space by vibration isolation units, which serve to dampen or eliminate mechanical vibration within the filter media caused by the operating fan. The invention provides efficient dust collection by virtue of the low velocity, laminar airflow through the filter, and greatly reduces release of dust particles from the filter media by virtue of the reduction of vibration within the filter media.

8 Claims, 14 Drawing Sheets

METHOD FOR FILTERING AIR IN LAMINAR FLOW

RELATED APPLICATIONS

This is a continuation-in-part application of Ser. No. 08/136,234, filed Oct. 15, 1993, now abandoned.

FIELD OF THE INVENTION

The invention relates to air filters designed to clean air in laminar flow and to the use of the filters in conjunction with any conventional working fan.

BRIEF DESCRIPTION OF THE PRIOR ART

The known prior art provides teachings of air pollution reduction units in combination with power driven fans. Filtering materials in the known units are typically rigidly attached to the members of a frame, as in U.S. Pat. No. 4,133,653, or fitted over the surface of a fan blade, as in U.S. Pat. No. 4,676,721. Consequently, the entire structure of the apparatus, including the filter media and any airflow duct is subject to vibration created by the operation of the fan drive motor, the fan propeller, and the resultant turbulent airflow. As a result of the vibrations throughout the apparatus, dust held by the filter media is subject to forces which cause migration of the dust within the filter and impact between dust particles causing release of very fine dust particles, on the order of 0.1 to 1.0 microns, into the surrounding atmosphere.

The prior art devices are therefore responsible for the release of large amounts of very fine dust particles, which are hazardous to humans. Allergens and toxic dust particles having a size of less than 1.0 micron cannot be "washed" out of the human body by mucus and are capable of passing through the thin membranes of the lungs and directly into the blood stream (see J. A. Timbrell, Introduction to Toxicology, New York 1989). The release of dust particles from prior art devices due to high airflow velocities and filter media vibration has resulted in inefficient filtration methods, thereby continuing the suffering of asthmatics and increasing the number of children having lead poisoning from lead based paint dust.

SUMMARY OF THE INVENTION

It is the principal object of the invention to improve the filtration efficiency of very fine dust particles from air by providing a filter for filtering air in laminar flow and by isolating the filter media from sources of vibration so as to not subsequently release previously collected airborne particulates.

It is a further object of the invention to provide an inexpensive means for filtering airflow associated with working fans, such as computer fans, household ceiling fans, and fans used in heating, air conditioning and ventilating equipment in homes, offices, factories, schools, and vehicles.

It is an object of the invention to efficiently filter from a laminar airflow dust particles such as, lead dusts from lead-based paint and lead containing solder joints, asbestos, allergens, dust mite excrement, and second-had smoke.

It is a further object of the invention to utilize ultra-violet lamps in combination with the filters of the invention to eliminate bacteria and germs from the air in public buildings such as, medical facilities and theaters.

The filters utilized within the instant invention are of the type which are conventionally used in domestic air conditioners. The filters are made of filter media which has been approved by the U.S. EPA and the Department of Health and Human Services (see U.S. EPA Technical Guidance, 2nd Edition, pp 159–163, 1988).

Further, the instant invention may be used for the purification of any liquid or gas for which the principles of the Bernoulli equation apply.

BRIEF DESCRIPTION OF THE DRAWING FIGURE

The invention will be better understood by an examination of following description together with the accompanying drawings in which.

Like numerals refer to like parts throughout the several views.

DETAILED DESCRIPTION OF THE PREFERRED EMBODIMENTS OF THE INVENTION

Figure 1:
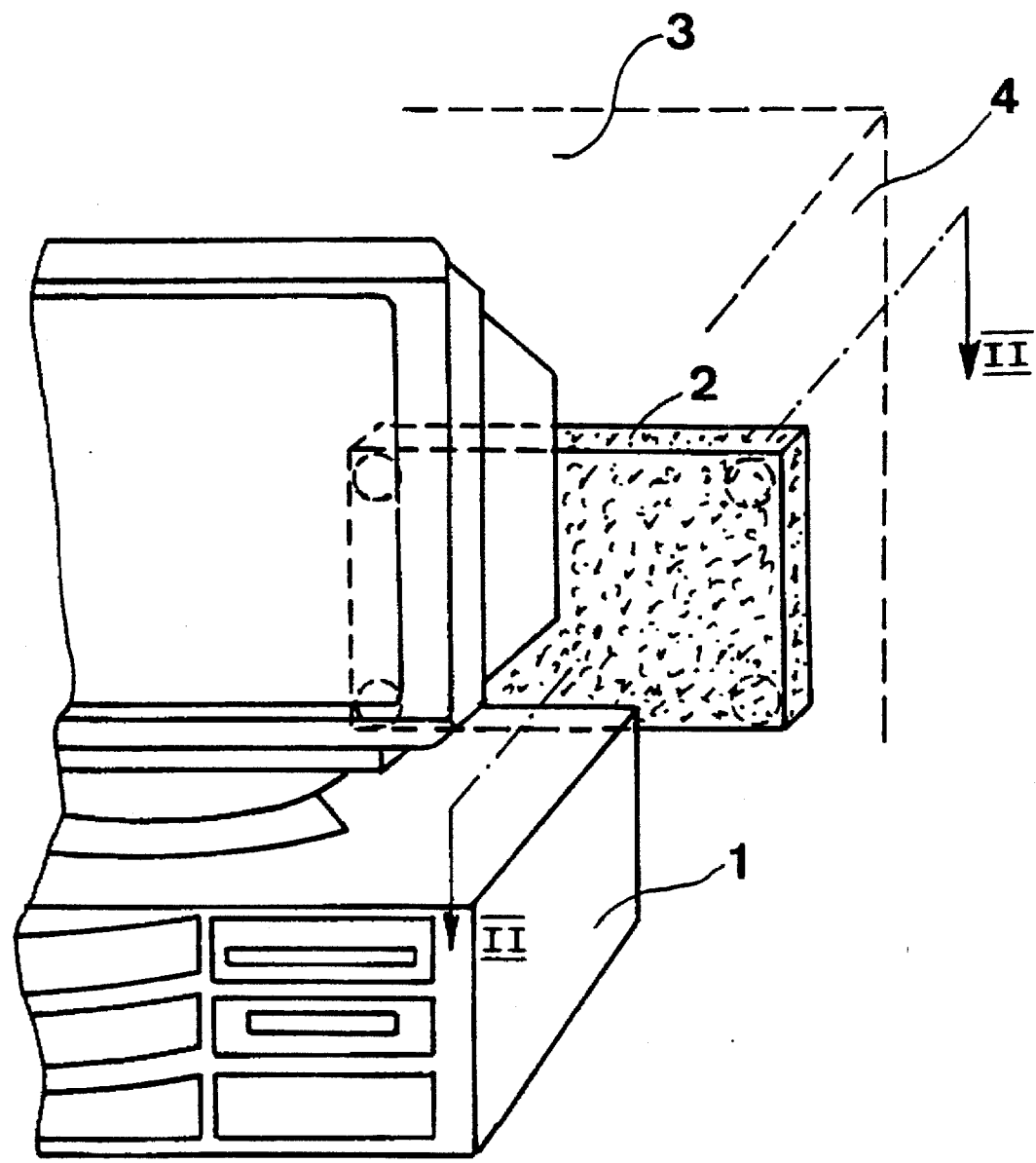
FIG. 1 is a view of typical computer with the air filter in the background.
Figure 2A:
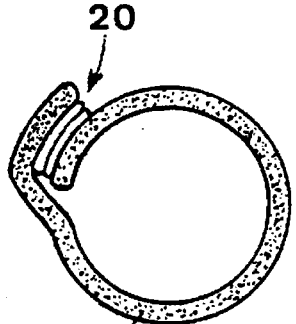
FIG. 2A is the view toward air filter 8 as indicated by the arrow U.
Figure 2:
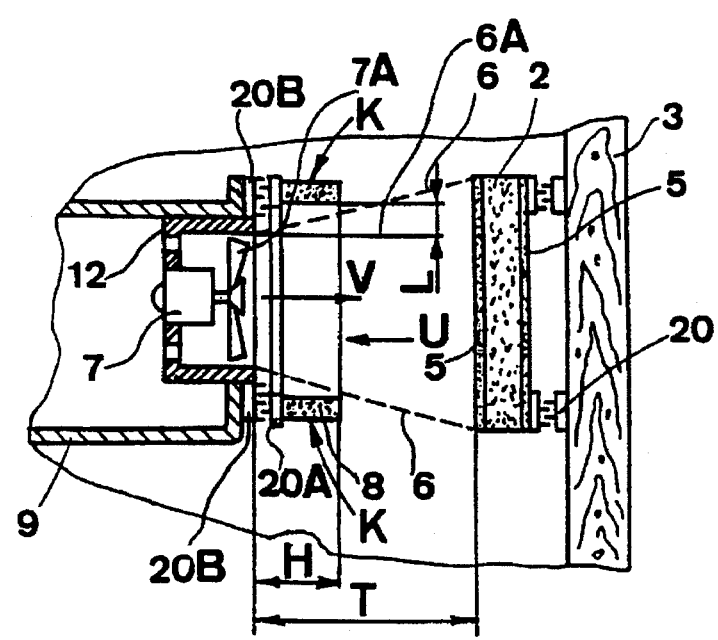
FIG. 2 is a cross-section view of the side of the computer, indicated by II—II in FIG. 1.

FIGS. 1, 2 and 2A show the most preferable usage of the invention, talking about typical personal computer 1 for the removal of air contaminants (lead particles) during the operation of the fan. There is a simultaneous work of the air filter 2 in the background and air filter 8, which is set beyond the limits of the air stream shown by dotted lines 6. Dotted lines 3 and 4 represent also the wall in the office or wall around the desk and behind computer 1.

Computer manufacturers require that a space of at least 5 inches is left between the back of the computer and the wall of office or wall around the desk. At this distance T, the air stream coming from the fan 7 in the direction of the arrow V expands to an area (shown by the dotted lines 6) and becomes less dense, partially slowing down the velocity of the air stream as it encounters the still air behind the computer. This air flows through the perforated membranes 5 and filter 2 in a velocity reduced regime. The perforated membranes 5 may be of any material including plastic, various screen, etc.

The surface area of perforated membranes 5 is provided with small apertures (in FIG. 1, 2, not shown).

The fact that the air stream coming from the computer's fan 7 slows down the velocity at the distance T, in combination with the fact that the air passing through perforated membranes 5, insures that the air flow through the filter 2 is substantially laminar (100 ft/min or less). Note U.S. Pat. No. 3,426,512, issued to A. G. Nesher, entitled "Ventilation Device For Producing Laminar Flow ". The Nesher method provides a laminar flow of air when the diameters of the apertures in perforated membranes 5 must not be larger that the thickness of the perforated membrane, and the percent of free area of the apertures in the membrane 5 should comprise from about five to fifteen percent of the total surface area of the membrane 5. For example, one sixteenth inch holes on five thirty-second inch staggered centers would give an open area of 21.8 square inches per square foot or 15%.

Satisfactory solution to the problem of the reduction of the free intake and exhaust area may take place when covering both sides of filter 2 with insect screen. The small holes required by insect screen, reduce the net free area to approximately 75% (see James E. Brumbaugh, "Heating, Ventilating and Air Conditioning", volume III, New York, 1984).

The air filter 2 preferably may be of any material, including the well known HEPA (High Efficiency Particulate Air) Filter, ULPA (Ultra Low Penetration Air) Filter and SIF® Filter Foam for Filtration Application with about 100 pores per linear inch.

To select the thickness of the air filter 2 as well as the thickness of all models of filters enumerated below in accordance with present invention, it is necessary to determine the velocity of the air stream with the aid of hot-wire or vane-type anemometer for measuring linear air flow, accurate to within ±3% of full scale (see I. E. S. Recommended Practice. "Laminar Flow Clean Air Devices", Institute of Environmental Sciences, Illinois, 1986).

In view of the fact that a laminar air flow or the air flow near it occurs in the filter 2, this filter is protected from aerodynamical vibration. The filter 2 is attached to elements of the wall of the office or the wall around the desk, or, with aid of the brackets, at the distance T, to the computer cabinet. In all these cases the filter 2 is fastened to the aforementioned elements with aid of vibration isolator unit 20, which is made from soft nap fasteners (VELCRO USA Inc.) or hook and loop fasteners designed to separate the air filter 2 from sources of vibration and to convert the mechanical vibrational energy into heat energy.

Referring now to the FIG. 2 and FIG. 2A wherein is illustrated the simultaneous work of the filter 8, which is the subject-matter of this invention, and the filter 2.

The filter 8 in cylindrical form, is attached to computer cabinet 9 of computer 1 with aid of VELCRO (hook and loop) which can have adhesive in the back. When pressed together the hook 20B and the loop 20A engage to create a secure closure. The fasteners isolate air filter 8 from the sources of vibration, i.e. computer cabinet, and provide vibration damping. FIG. 2A shows that VELCRO fastener 20 provide an adjustable closure: it offers the opportunity to change the diameter of the filter 8.

FIG. 2 and calculations permit to realize what forces the unclean air to pass through filter 8 in a laminar regime. Fan 7 which is fastened in the frame 12 starts to work when the computer is on, which takes the air from the inside space of computer 1. The air, which was immovable inside the filter 8, starts to move along the arrow V. Here comes the air stream with the radius R, which is equal to the radius of the fan blades 7A According to Bernoulli principle, the pressure of air on a surface inside the filter 8 decreases because the air moves. Hence, the pressure of the air under filter 8 is less than the atmospheric pressure outside. As a result of this pressure differential$\Delta$ P, a part of the air, where the computer is installed, will come into the filter along the arrows K and be purified. Experimentally, it is stated, that the said pressure differential$\Delta$ P does not exceed more than from 0.01 to 0.2 inch of water. The calculated data check agree with those found by experiment.

Personal computers in America typically have the boxer fan for cooling with blade sizes D=0.09 m and flow rate Q=43 CFM (Thomas Register Catalog File, 1995, page 4505).

Let us now:

1. calculate the change in pressure (or pressure differential) $\Delta$ P from outside the air filter 8, FIG. 2 where the pressure is atmospheric, to the reduced pressure inside air filter 8, where the pressure decreases because the air moves with velocity $V_1$;
2. select the type, pore sizes in ppi (pores-per-linear-inch) and thickness of air filtering material.

We can use Bernoulli's Equation: $_\Delta P = \frac{1}{2} PV_1^2$ Eq (1) (see Physics, A General Introduction, Second Edition, Alan Van Heuvelen, 1985, Example 14.6, pages 301, 302) to find the pressure differential$\Delta$P.

We now know the following information:

P is the density of air=1.3 kg/m$^3$;

D is diameter of fan's blades=0.09 m;

A is cross sectional area of air stream which is created by fan blades:

$$A = \frac{\pi D^2}{4} \ ;$$

Q is the fan's flow rate=43 CFM.

Since 1 feet$^3$=0.028 m$^3$ and 1 min =60 sec $$Q = \frac{43 \times 0.028}{60} = 0.02 \text{ m}^3/\text{s}$$

$V_1$ is the velocity of the air flow passed through the cross section of area A and inside air filter:

$$V_1 = \frac{Q}{A} = 3.15 \text{ m/s}$$

Substituting the above information in Eq (1) for $\Delta$ P we find:

$$\Delta P = \frac{8pQ^2}{\pi^2 D^4} = \frac{8 \times 1.3 \times (0.02)^2}{(3.14)^2 \times (0.09)^4} =$$

6.4 N/m$^2$ = 0.024 inch of water.

With the pressure differential between the outside of the air filter located on the outside of the fan and the inside of the air filter located near the fan blades we now have all the necessary information required for the appropriate air filter material from manufactures tables.

For filtration application in the present example select FOAMEX Co. SIF Filter FOAM, articulated flexible polyester urethane foam. It has a three-dimensional structure of skeletal strands which gives it unique filtering properties. SIF is completely safe. There are no metal or glass particles to harm the hand or pollute the air we breath with dust particles generated for example, by fiberglass filter, because of vibration.

SIF® is also nonallegenic and resistant to detergents. Benefits also include wide range of particle size filtration due to a range of pore sizes available.

On graphs (FIG. 14) of the Technical Data Sheet for SIF® Filter Foam manufactured by Foamex Co., we can see velocity versus resistance or pressure differential $\Delta P$, as well as different thickness of the filtering material and different pore grades (pore-per-linear-inch i.e. ppi).

Let's point off distance=$\Delta P$=0.024 inch on the X axis of all graphs, and draw the straight perpendicular line I—I.

On the top graph we can see that if the pressure differential $\Delta P$=0.024 inch of water, and the thickness of SIF® is 1 inch and of 30 ppi, the velocity of air flow through the filter will be 100 ft/min.

The second graph shows that air flow velocity through 1 inch thick pad of 41 ppi SIF will be only 65 ft/min.

The third graph shows that if SIF is of ¼ or ½ inch and of 59 ppi, the velocity of air flow through the filter will be 100 ft/min and 55 ft/min correspondingly.

The bottom graph shows that air flow velocity through ⅛ inch thick pad of 84 ppi SIF® will be only 60 ft/min. Two- or three-stage filters can be produced by combining several pore sizes and different physical properties. For example, a combination of paper filter and foam filter, foam filter and filter of silver impregnated activated carbon (effective bacteriostatic media). In any of the porosity grades, either a flame retardant or bacteriostatic additive designed to protect the foam from deterioration and musty odor can be incorporated into the filter foam.

Air flow through filter media at 100 ft/min (50 cm/s or less is determined in accordance with Federal Standard 209E and IES Recommended Practice Laminar Flow Clean Air Devices, as laminar.

It will be noted that Bernoulli's Equation does not take in consideration the frictional losses of the air flow which diminish the speed $V_1$ from 5 to 10%. This fact positively influences the quality of the filtration, because it diminishes the velocity of the stream of contaminated air through the filter, and the duration of contact between the air and filter become longer.

The calculation which concerns the selection of the filter material, cited above, based on the method of the present invention i.e. placing the filtering material on the definite distance beyond the external surface of the air stream, can be widely adopted for other ventilating, heating and air conditioning systems as well as for domestic electric fans and industrial floor fans.

Air flow velocity can be determined with technical data sheet obtained from manufacturers or by measuring with aid of hot-wire or vane—type anemometer for measuring linear gas flow, accurate to within 3% of full scale. If it is impossible the data can be taken from Table 1.

TABLE 1

Recommended velocities for ventilating heating and air conditioning systems

| | Velocity | | | |
| | Public buildings | | Industrial plant | |
| Service | m/s | ft/min | m/s | ft/min |
|---|---|---|---|---|
| Air intake from outside | 2.5–4.5 | 500–900 | 5–6 | 1000–1200 |
| Heater connection to fan | 3.5–4.5 | 700–900 | 5–7 | 1000–1400 |
| Branch supply ducts | 2.5–3.0 | 500–600 | 4.5–9 | 900–1800 |
| Supply registers, grilles and diffusors | 1.2–2.3 | 250 | 1.5–2.5 | 350–500 |

Velocities from domestic electric fans and industrial floor fans 3–10 m/s (2000) ft/min.

Source: "F. Porges, "HVAC, Engineer's Handbook", Ninth Edition, 1991.

When the material of the filter and the thickness are selected i.e. these which provide the laminar nature of air flow, it is necessary to determine the width H of the filter and the distance L it must be installed perpendicularly to air stream. Going through the slot, the air flow dilates. The angle of the air stream's expansion is about 15°. On FIG. 2, this is angle between lines 6 and 6A, which is determined by experiment. FIG. 2 shows that L ≈tg 15°×H=0.26×H (Equation 2). Eq. 2 determines the distance L depending of the width H of the filter, i.e. distance which separate the filter from edge of round or rectangular slot. In spite of all this, the filter, which the width is H will not touch the air stream and will not affect the productivity of the ventilator which creates the main air stream. The present invention is designed for improving the great number of the units with running fans being in wide usage in America (air conditioners, domestic electric and ceiling fans, forced ventilation systems, the two electric fans per school bus, almost all computers, etc.), more than 700 million. The width H of the filter must be determined taking into account data on Table 2 and the following:

A too wide filter can ruin the view of original design of unit. It must not put an obstacle in the way of working unit. For example, the wide filter will also impede the fan's oscillation (there are more than 300 million oscillating fans in America). The large air filter is not enough to be self-supporting. It needs a support such as wires or frame to hold filter material under air flow.

Table 2 shows the recommended width H of different filters and the proper distance L from the edge of the round or rectangular slot,through which the air stream flows through an outlet or inlet, to the filter.

TABLE 2

| Dimension of fan in inch | 3½ | 6 | 8 | 10 | 12 | 16 | 18 | 30 |
|---|---|---|---|---|---|---|---|---|
| Radius of fan blades of round or rectangular slot | 4.5 | 7.62 | 10.16 | 12.7 | 15.25 | 20.32 | 22.86 | 38.1 |

TABLE 2-continued

| (R or Re) in cm Width of filter (H) in cm | 3 to 4.5 | 5 to 6 | 5.5 to 6.5 | 6 to 7 | 6 to 7 | 7 to 8 | 8 to 9 | 9 to 15 |
|---|---|---|---|---|---|---|---|---|
| L = 0.26 × H in cm | 0.8 to 1.2 | 1.3 to 1.6 | 1.5 to 1.7 | 1.6 to 1.9 | 1.6 to 1.9 | 1.9 to 2.1 | 2.1 to 2.4 | 2.4 to 4 |

For rectangular slots the equivalent radius must be used $$R_e = 0.565 \sqrt{F}$$

Where $R_e$ is equivalent radius and F is area of rectangular slot.

The filters which are manufactured allowing for the recommendations of the Table 2 are strong enough to be self-supporting, therefore the vibration isolator units can be directly fastened to the filtering material.

Thus the motion of unclean air through filter 8 will be laminar. In laminar motion, the quality of the air filtration is high, the finest dust makes clogs inside the filter (agglomerates). Filter 8 is usually made of the dust absorbing foam. It can be washed in soapy water.

Figure 3:
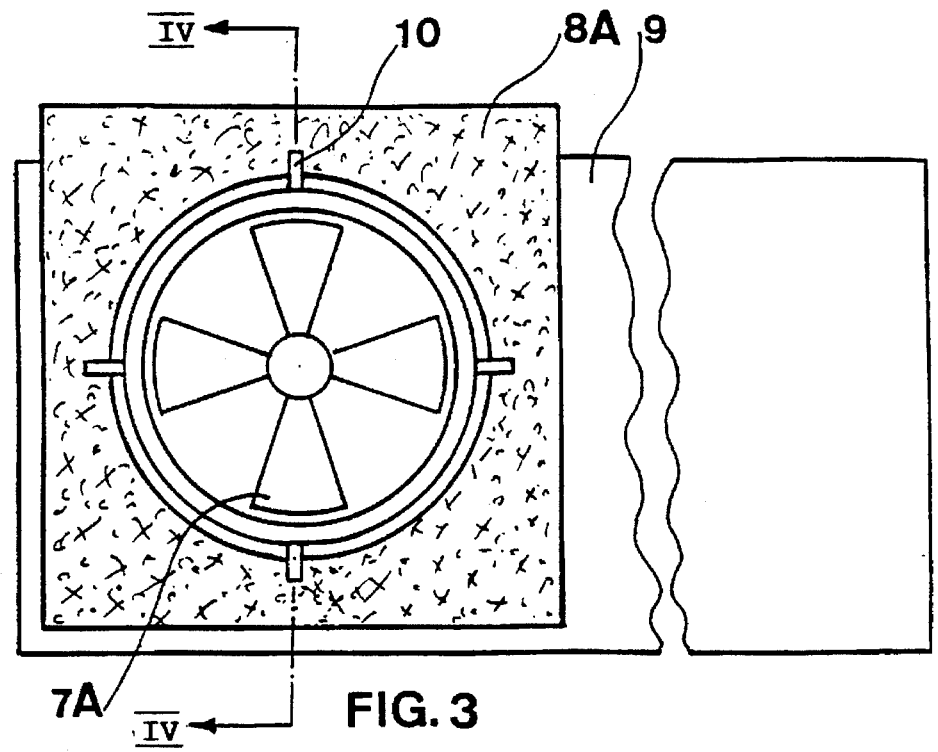
FIGS. 3–6 are two models of the air filter in accordance with present invention for personal computer.
Figure 4:
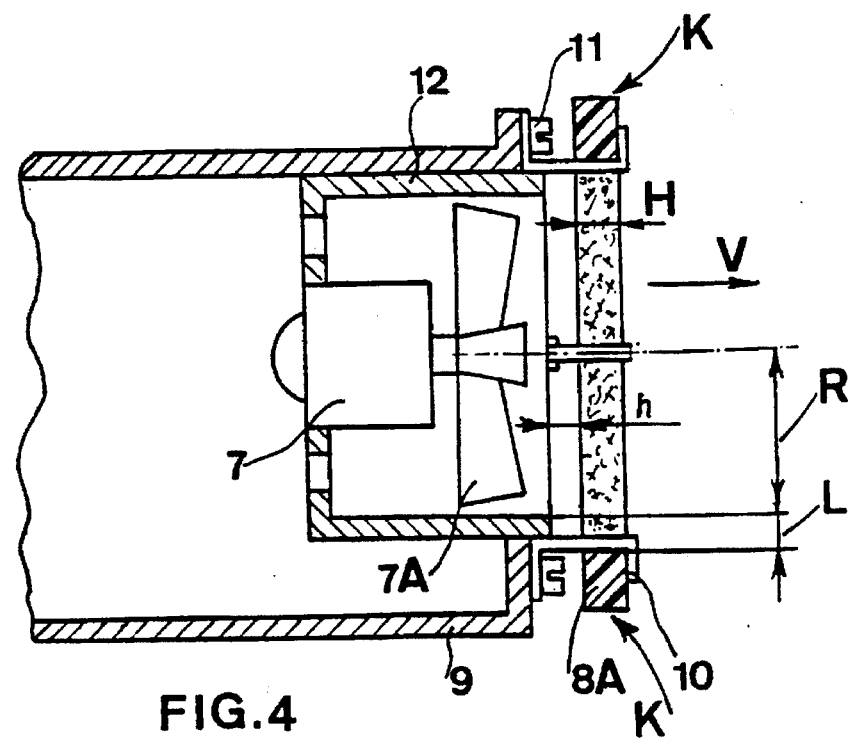

FIGS. 3 and 4 relate to the design of filter 8A, such that FIG. 4 is a cross-sectional view taken along lines IV—IV of FIG. 3. Filter 8A is identical to filter 8 (FIG. 2), with the exception of its rectangular form, which permit use for specific applications. For example, a lot of electric wires in the back of some computers won't permit the use of a wide filter. Further, the rectangular form of filter 8A allows a greater dust-holding capacity than filter 8 (FIG. 2).

Filter 8A is set on brackets 10, made from elastic material, which are attached between two rubber lids (on FIGS. 3,4 not shown) with the screws 11 to the computer cabinet 9. Because the brackets 10 are made of elastic and only slightly touch with the soft elements of filter 8A, and also because the brackets 10, are attached to computer 9 with screws 11 by means of rubber lids, the vibrations of motor, blades 7A, and fan 7 are not transferred to filter 8A completely.

As a result of lessening of the mechanical vibrations of filter 8A, and also because the aerodynamical vibration is absent in it, as the laminar stream passes through filter 8A, the particles, which are detained in filter 8A will not impact with each other. Also, the dust particles bear less friction against the material of filter 8A. This results in lessening the release of very fine dust, such as allergens the size of which are less than 1 micron, which is hazardous for human health.

Figure 5:
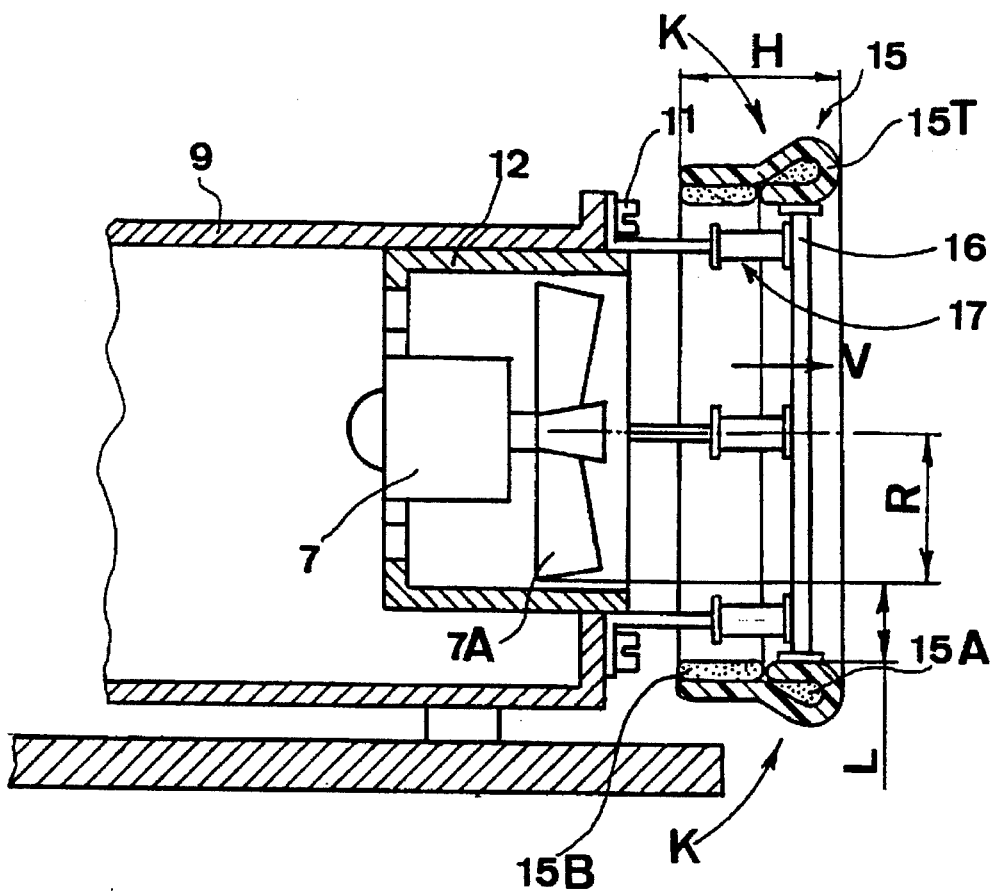

On FIG. 5 is shown filter 5, which is similar to filter 8, shown on FIGS. 2, with the difference that filter 15 is designed to be used in enclosed areas, where the tubercular or asthmatic patients are present, and there is a necessity to block fluffy dust particles.

Filter 15 is installed in the same manner as filter 8, that is beyond the limits of the expanding air stream, made by fan 7. That is why the cooling efficiency and productivity of the fan are unchangeable, and the air flow through filter 15 will be laminar. Laminar air flow improves the chances of the particles being caught. All this is proved experimentally.

The basic element of filter 15 is a tissue material 15T, which blocks the dust particles, having a fluffy structure. For example, 80% of lead poisoning among children take place as a result of breathing in the dust, formed from destroying old lead-based paint. This dust has fluffy structure. The element of filter 15A blocks the particles with the smooth surface. Another element of filter 15B is activated carbon and selves to block pathological TB and other germs, air-suspended, and also asthma irritants and tobacco smoke. The element of filter 15B is installed when the computer is used in hospitals, etc.

Figure 6:
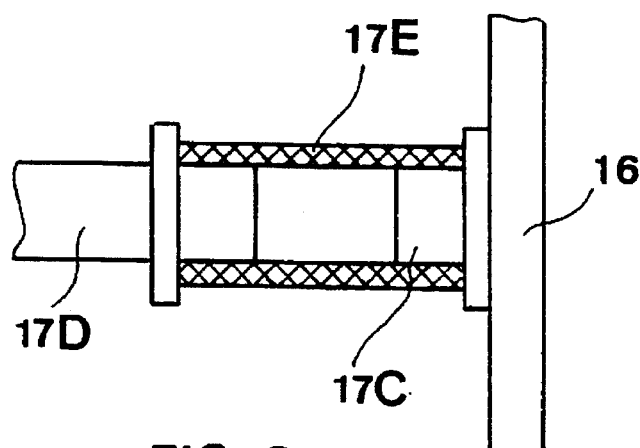

Filter 5, with the help of the vibration isolator units is attached to the computer cabinet 9. The vibration isolator unit (FIGS. 5 and 6) consists of the ring 16 and brackets 17. Each bracket 17 consists of legs 17C, 17D and a rubber 17D tube 17E, which fades the vibration of the computer cabinet 9. The vibration isolator units details 16, 17, 17C, 17D and 17E) are attached to computer cabinet 9 with the help of the screws 11. Filter 15 is attached to ring 16 with the help of the VELCRO fasteners 20 and clips 19 (shown in FIGS. 7 and 8), or just are put on ring 16.

Figure 7:
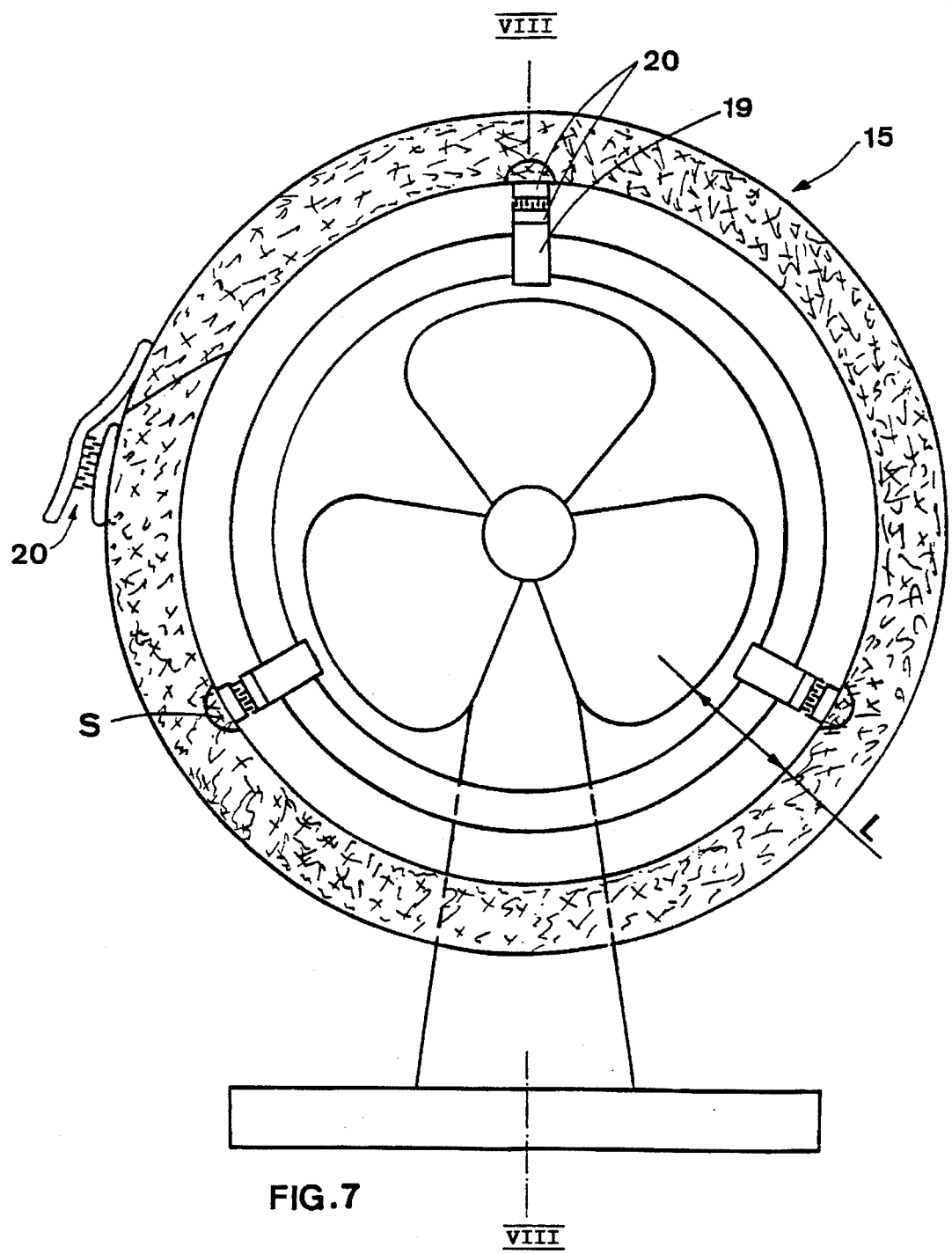
FIG. 7 is an air filter cylindrical form in accordance with this invention and domestic fan assembled together.

FIG. 7 shows on the front plan the same filter 15, which was described in detail above (FIG. 5).

Figure 8:
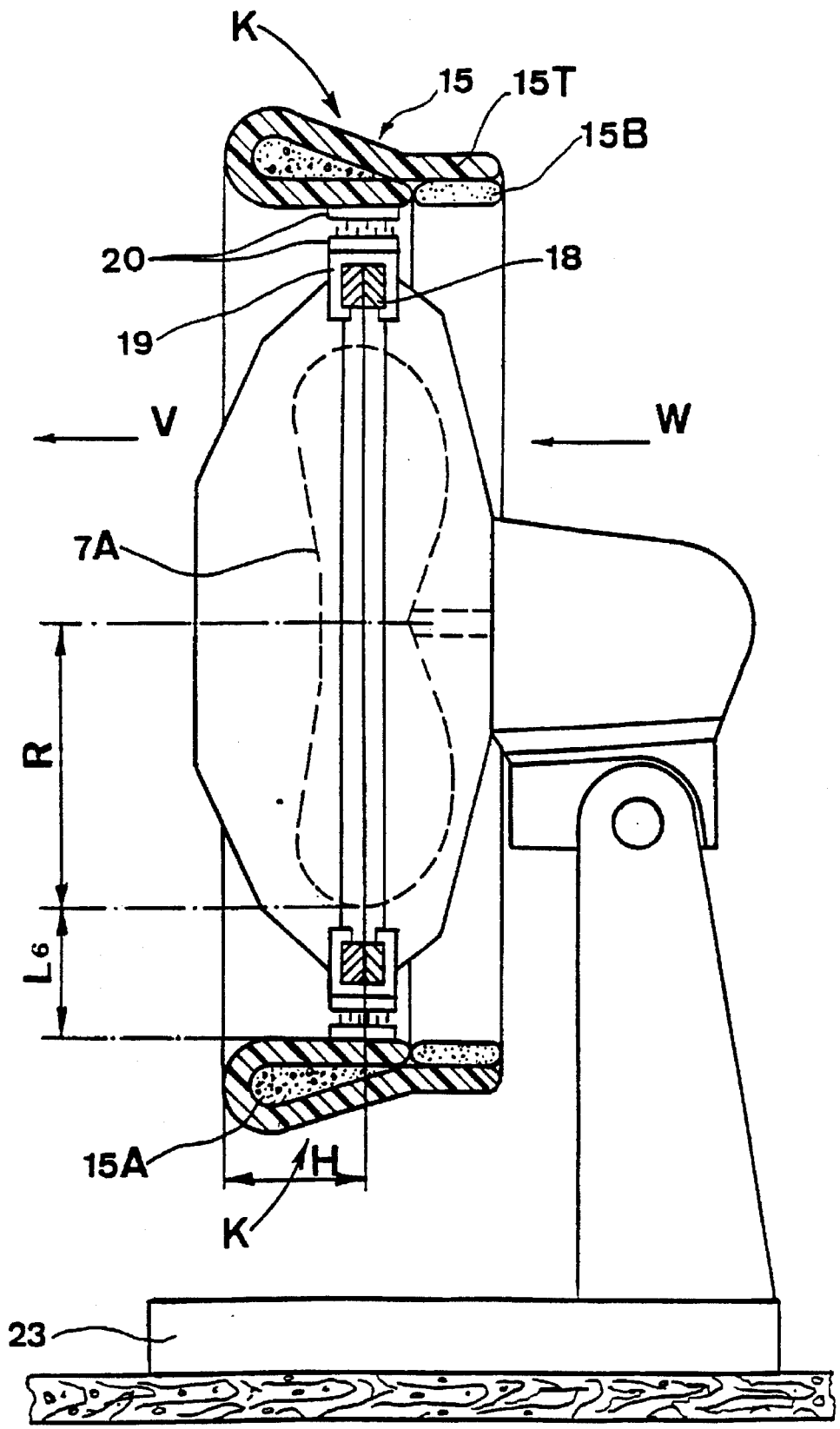
FIG. 8 is a cross-section along line VIII—VIII of FIG. 7.

FIG. 8 shows the section along the line VIII—VIII of filter 15, shown on FIG. 7. Filter 15, shown in FIGS. 7 and 8, differs by being installed on the conventional household fan 23, its cooling efficiency stays unchangeable.

Filter 15 is attached to guard ring 18 with the help of elastic clips 19 and VELCRO fastener 20. As it is seen on FIG. 7, filter 15 touches ring 18 through soft materials of the filter 15 only in three areas S. Elastic clips 19 and VELCRO fasteners 20 perform the vibration isolator units. Filter 15B is a foamed material, enriched by the activated carbon. Filter 15B can be attached to filter 15 by means of VELCRO fasteners.

More than 400 million fans of this kind are regularly used by Americans. These fans raise toxic dust particles, asthma irritants, lead dust, etc., blow off the large and small particles from the walls, ceilings, furniture, various apparatus, etc. The toxic particles collide with each other under influence of turbulent air stream and tend to generate a lot of ultra fine dust. Whereas, very fine particles pose the greatest health risk, there has not to date been any type of filter device to be used in conjunction with household fan, where in the cooling efficiency and productivity remain unchangeable.

The present invention solves these tasks on a global scale.

Taking into account that the air filter, which is shown on FIGS. 7 and 8 can be installed on any conventional household fan, it can take precedence over many types of air filters on the market and have wide use. The low price (from $3 to $18) makes the invention affordable. It is necessary useful for every household, office, school, etc., because, as studies have determined, indoor air is 100 times more polluted than outdoor air. The air indoor contains much lead, asbestos-based dust, and excrement of the dust mites. The latter is responsible for 70% of asthma cases. 20 million people suffer from this disease, among them 3.5 million children.

There are more than 1,000,000 bridges in America. They all contain lead-based paints. When the bridges are sand-blasted air pollution in the neighborhood increases more that 10 times. When the bridges are fixed the content of lead in the blood of the children is twice as much (New York Times, Aug. 22, 1992).

Figure 9:
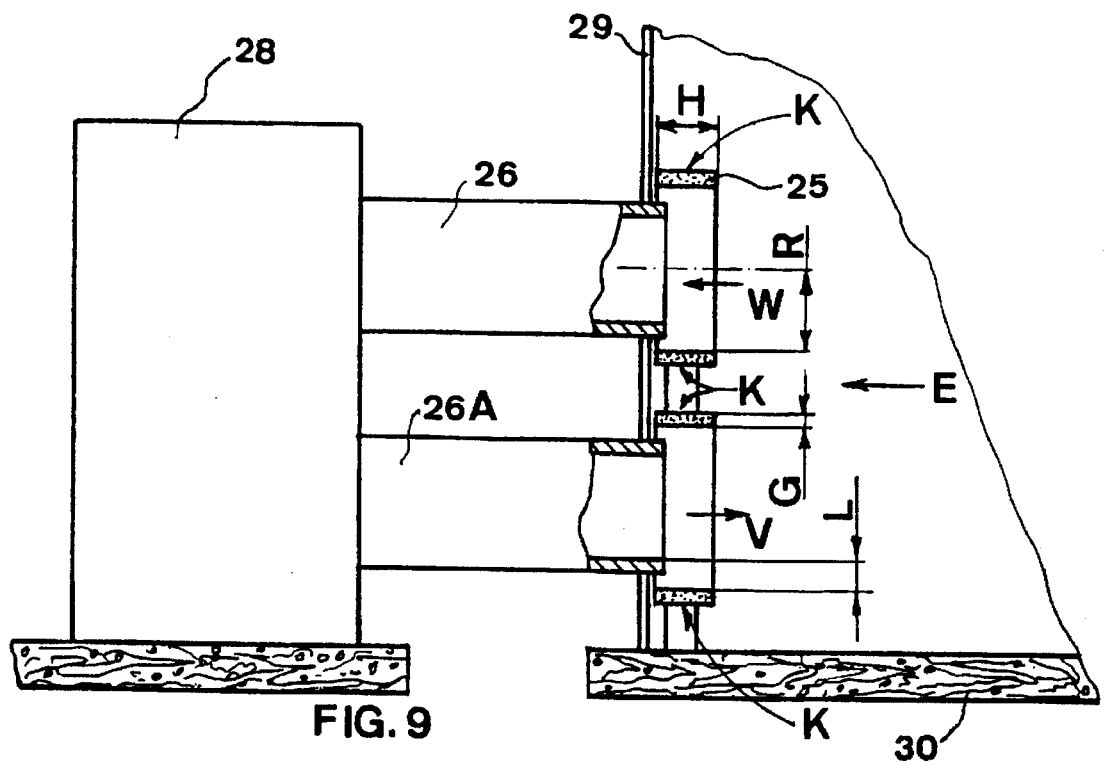
FIG. 9 is a view of the tent routinely installed in the arid regions where sand storms occur frequently. This tent is equipped with an air conditioner including an air-filtering system in accordance with this invention.
Figure 9A:
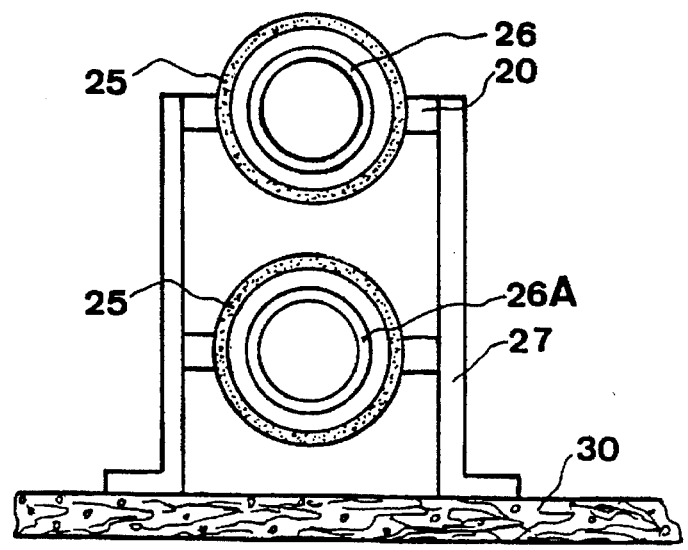
FIG. 9A is a view in direction indicated by the arrow E of FIG. 9.

Referring now to FIG. 9 and 9A, there is shown a view of the tent 29 which routinely is placed on the wood floor 30.

It is installed in the areas of the arid regions where sand storms occur frequently or many various labile (but potent) dangerous chemicals are concentrated. The tent is equipped with an air conditioner 28. The hot air from indoor passes through the pipe 26 of the air conditioner 28 in the direction as indicated by the arrow W, and the cool air passes through the pipe 26A as indicated by the arrow V. This air flow has a turbulent nature. Harmful allergens and pollutants are not removed by standard air conditioner filters, which only trap the larger particles. And what is more, it absorbs all aerodynamic energy formed in the turbulent flow, and all mechanical vibration formed in the air conditioner's motors, fan blades, etc. The toxic particles trapped inside enumerated in the above units, collide with each other under the influence of vibration.

As a result, the small particles break into smaller pieces i.e. 0.25 micron and smaller, and therefore increase in number. Therefore, it is necessary to install in addition; inside the tent an air filtration system in accordance with present invention. This system includes two tubular air filters 25 having thickness G and width H. One of them is placed beyond the air stream at distance L on the intake side of the pipe 26 which has radius R, the other is placed beyond the air stream at the same distance on the discharge side of the pipe 26A which has radius R.

The filters 25 are held in place by readily detachable fastenings, such as hook and loop fasteners 20 (Velcro) or the like, so that the filter 25 can be removed easily for cleaning or replacement. Hook and loop fasteners 20 are secured to two brackets 27, which are completely isolated from vibration of the pipes 26 and 26A, and the units inside the air conditioner 28.

Owing to the fact that the filters are placed around the air stream, the pressure of air inside of every filter 25 decreases because the air moves as indicated by the arrows W and V. The pressure of air on the exterior surfaces of air filters 25 remains atmospheric. As a result, the dusty air goes through the filters, as indicated, by the arrows K in laminar regime with reduced vibration. The calculation which concern the selection of filters 25 is the same as for filter 8 (FIG. 2 and 2A).

Figure 10:
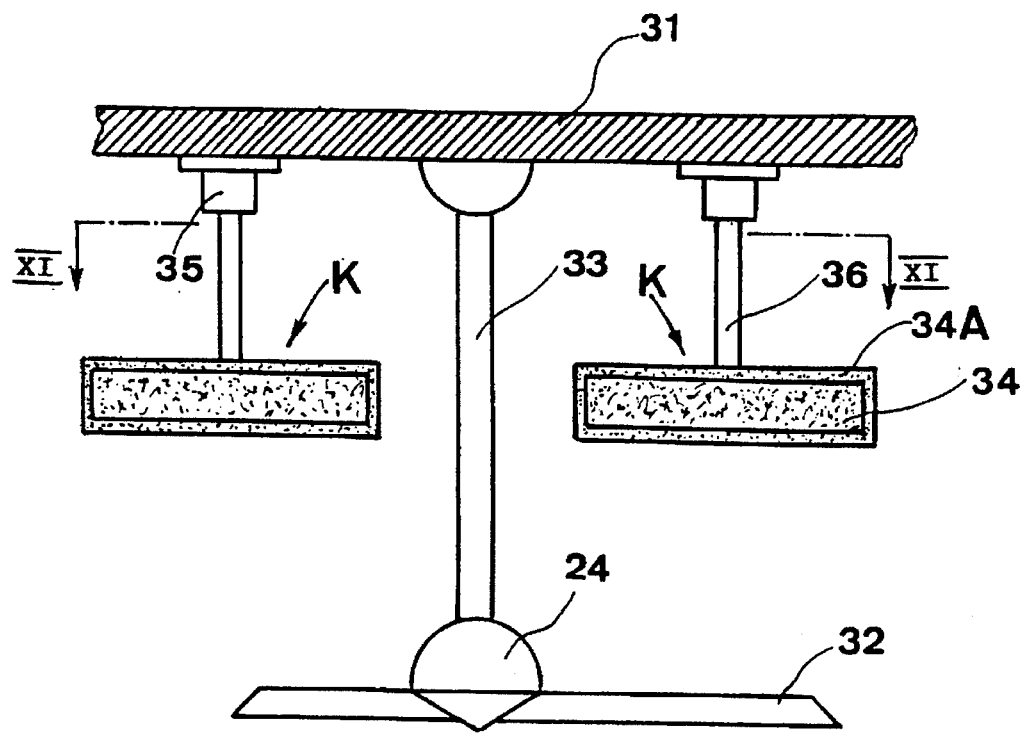
FIGS. 10–12 are the views of air-filtration apparatus in the room, equipped with a ceiling fan.

FIG. 10 shows the air-filtration apparatus in the room, equipped with the ceiling fan, which hangs on hanger bracket 33. For the air filtration the filter (no less than in one set), put between two perforated membranes 34A, is placed between ceiling 31 and blades 32. Details 34 and 34A are attached to ceiling 31 with the help of hanger-bracket 36 and vibration isolator unit 35, which necessity is explained by vibration coming through hanger-bracket 33 to ceiling 31 as a result of wear and tear of the electric motor 24 bearings, disbalancing or beating of blades 32 when pollution sticks to them, periodic pulsations of pressure made by the blades 32 when rotating.

Under influence of vibration, without the vibration isolator unit 35, filter 34 will release fine dust, which has accumulated therein. Under the influence of vibration, the filtering materials lose the ability to keep the dust. The ultra-fine dust, formed inside the vibrating filter and thrown into the room, is human-hazardous. As a matter of fact, plenty of big and small dust particles, which are inside the filter, interact and impact with each other and the filter material. The resultant particles are so small, that their size is less than 1 micron. Such tiny particles get directly into the blood stream.

Figure 11:
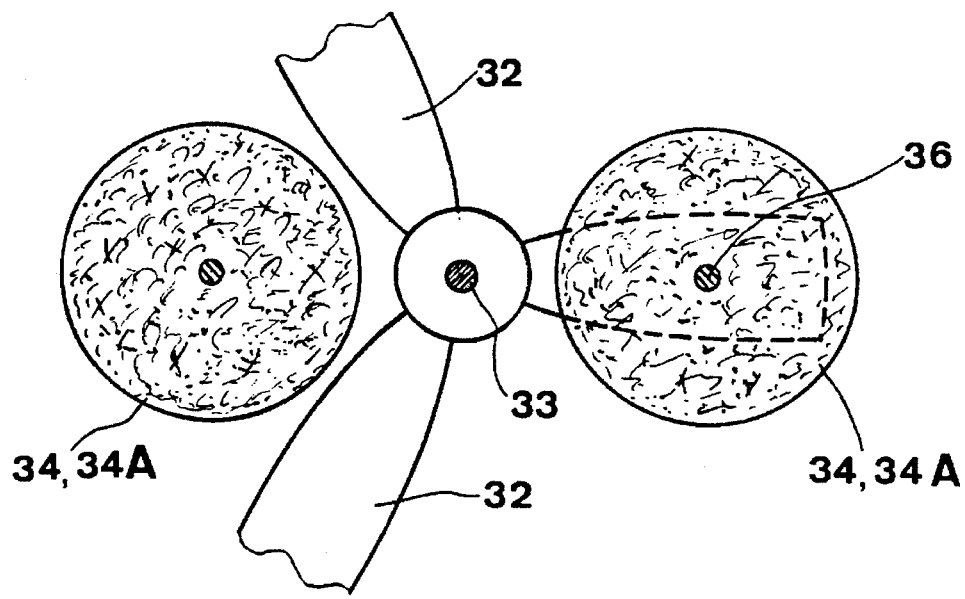
Figure 12:
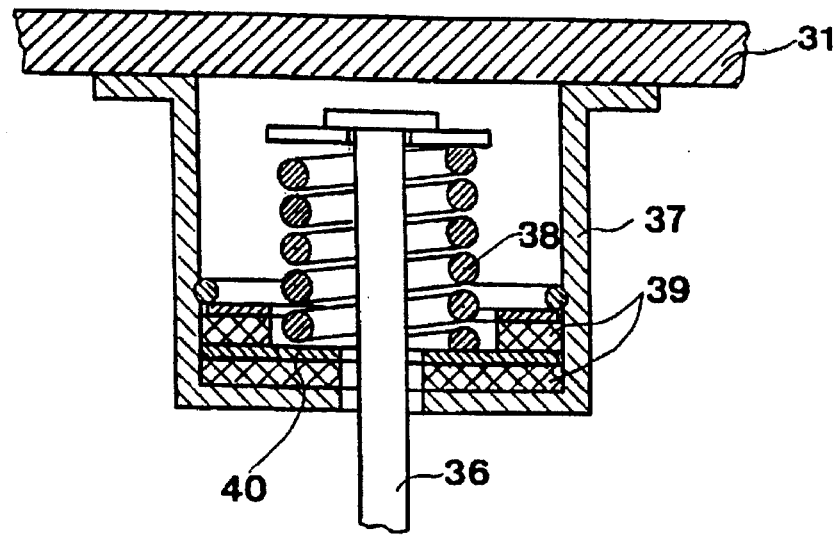

In FIGS. 10, 11, and 12, arrow K shows the air direction through perforated membranes 34A and filter 34, when blades 32 are rotating.

Design of filter 34 and perforated membranes 34A shown on FIGS. 10 and 11, and origin of the laminar air stream passing through them, are expounded above, while the filter 2 and the perforated membranes 5 are described on FIGS. 1 and 2 because these details are identical.

FIG. 11 shows the section along XI—XI of the unit shown on FIG. 10.

FIG. 12 shows vibration isolator unit 35, which consists of frame 37 attached to ceiling 31. Hanger-bracket 36 is attached to spring 38. Plate 40, to which spring 38 is attached, is placed between rubber pads 39, to heighten the efficiency of the vibration isolator unit on high frequencies. The shown type of vibration isolator unit decreases the vibration of filters 34 caused by the working ceiling fan.

Figure 13:
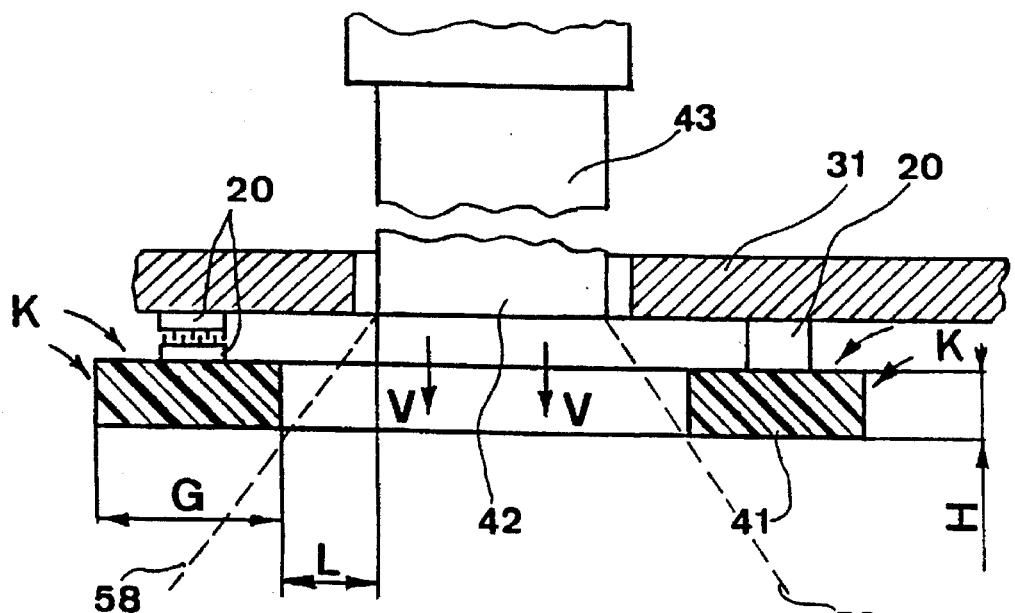
FIG. 13 is a view of a diffusor (or grill) in cross-section through which the fresh air comes where beyond the limits of the air stream filtering material is placed in accordance with this invention.

FIG. 13 shows diffusor 42 in section through which along the arrows V the fresh air comes to the room. Beyond the limits of the basic stream of the air, the filtering material is placed, which is attached to ceiling 31 with the help of vibration isolator units 20. The work of filter 41 takes place in a laminar regime identically to the work of filters on FIGS. 2–8: the basic stream of the air comes through the round slot of the diffusor 42 along arrows V, being polluted along arrow K. As diffusor 42, ceiling 31, tube 43 undergo mechanical and aerodynamic vibration, it is necessary to attach filter to ceiling 31 with the help of vibration isolator units 20. Filter 41 and vibration isolator units 20 are indispensable because the particles of dust cumulated in the tube 43 collide with each other under influence of vibration and tend to generate a lot of ultra-fine dust.

Figure 14:
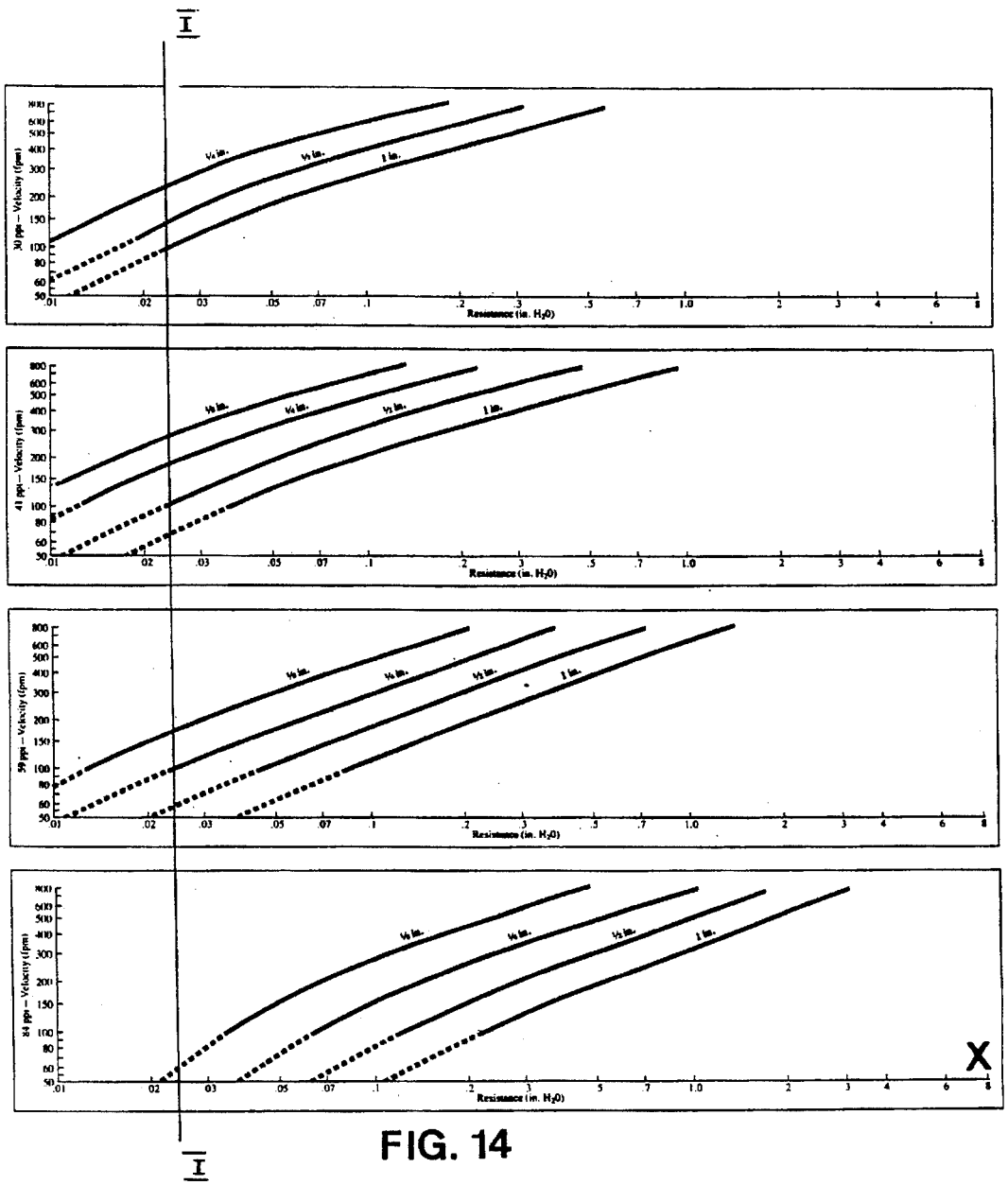
FIG. 14 is a graph illustrating the technical data sheet for SIF filter foam manufactured by Foamex Co.

The thickness (G) of the filter 41 (FIG. 13) can be defined with method described in the details above, using the data usually obtained from manufacturers (see, for example, Technical Data Sheet FOAMEX Co., "SIF® Filter FOAM for Application", "Velocity vs Pressure Differential (Resistance)", (see FIG. 14).

The distance L, at which the filter 41 must be set from the edge of the round slot of diffusor 42 (FIG. 13), can be found on Table 2, referring to the radius of fan blades or the radius of round slot. As to rectangular slot of diffusor, its area can be substituted, with enough for practice precision, by the equivalent area F of the round slot.

$$Re = 0.565 \sqrt{F},$$

where Re is radius of equivalent round slot in cm; F is area of rectangular slot in cm$^2$.

The width H of filter 41 can be calculated also with aid of Table 2. The limits of the air stream shown by dotted lines 58.

If a diffusor widens in its base, the distance L redoubles.

If something (protective cage, grill, housing, etc.) considerably impedes the placement of the filter at definite distance L, it is necessary to take in consideration the fact that with L>2R (2R$_e$) the efficiency of working filter decreases more than by 60%.

Figure 15:
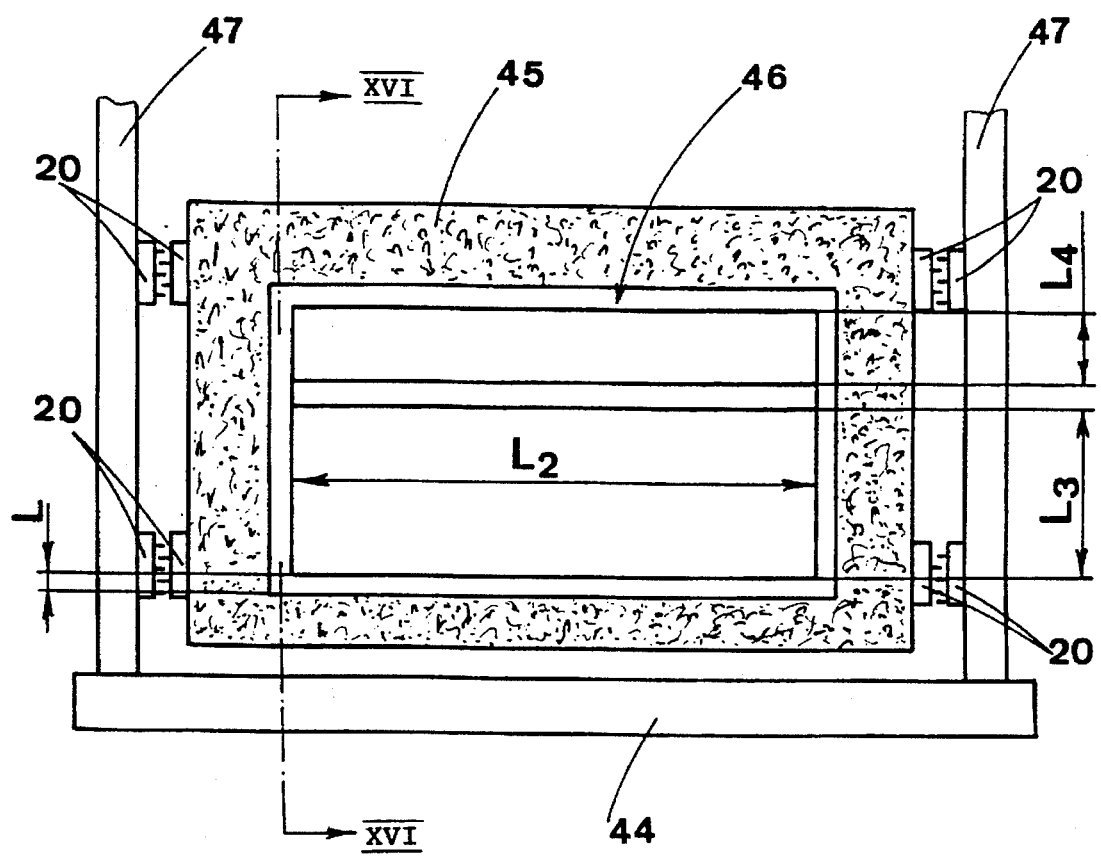
FIGS. 15–16 is a view of an air-conditioner installed in a window with the air filter which is set around the perimeter of the frame of the conditioner in accordance with this invention.
Figure 16:
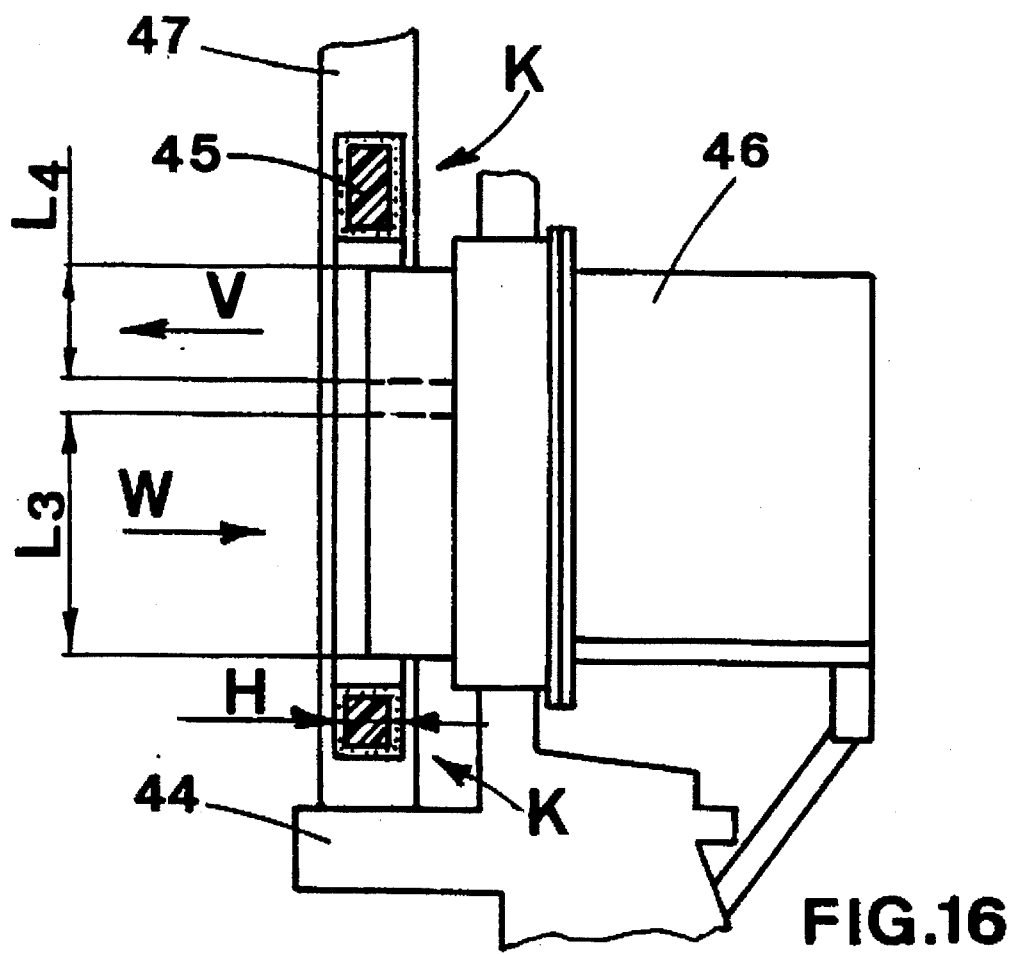

FIGS. 15 and 16 show the air conditioner 46, installed in the window (details 44 and 47). Filter 45 is set around the perimeter of the air conditioner 46, without touching it at the distance L.

Filter 45 works in a laminar regime like the filters on FIGS. 2–8 and 13. The basic streams of the air move in two directions: the air enters in air conditioner 46 along the arrow W through rectangular slot, which has the area $F_1=L_3 \times L_2$ and enters indoor along the arrow V through the rectangular slot, which has area $F_1=L_4 \times L_2$. The sum total of the two areas $F=(L_3 \times L_2)+(L_4 \times L_2)$. To determine the width H of the filter 45 and the distance L, using Table 2, it is necessary to find radius of equivalent round slot Re (in cm): Re=$0.565\sqrt{F}$ (see description of FIG. 13). The thickness G of Filter 45 can be defined with method described in the details above with the description of FIG. 2 and FIG. 14.

Because the air moves through the front side of the frame of air conditioner, the pressure differential $\Delta P$ is formed in accordance with Bernoulli principle. Under influence of $\Delta P$ polluted air passes through filter 45 along arrows K (FIG. 16). People, who have air conditioners, think that there is filter inside, which cleans the air quite sufficiently. Indeed, the filter is set in the way of the basic air stream. It is pressed between the armature of the air conditioner and it absorbs completely all vibration energy formed in the fan motor, blades, chassis and some part of the duct of the air conditioner. Under the influence of vibration the standard filter starts to release the dust, which is accumulated in it. Under the influence of vibration, the filtering material partially loses the ability to keep the dust. Then the turbulent air motion and vibration shake small particles out into the surrounding air space (for example, classroom, a ward in the hospital, etc.).

So, in America, all air conditioners tend to generate large amount of ultra-fine dust.

Filter 45, which is set, according to present invention, around the perimeter of the air conditioner 46 (FIG. 15), provide the laminar air motion, safeguards filter material from vibration and prevents formation of fine dust. FIG. 16 presents a section along XVI—XVI of air conditioner shown on FIG. 15.

Figure 17:
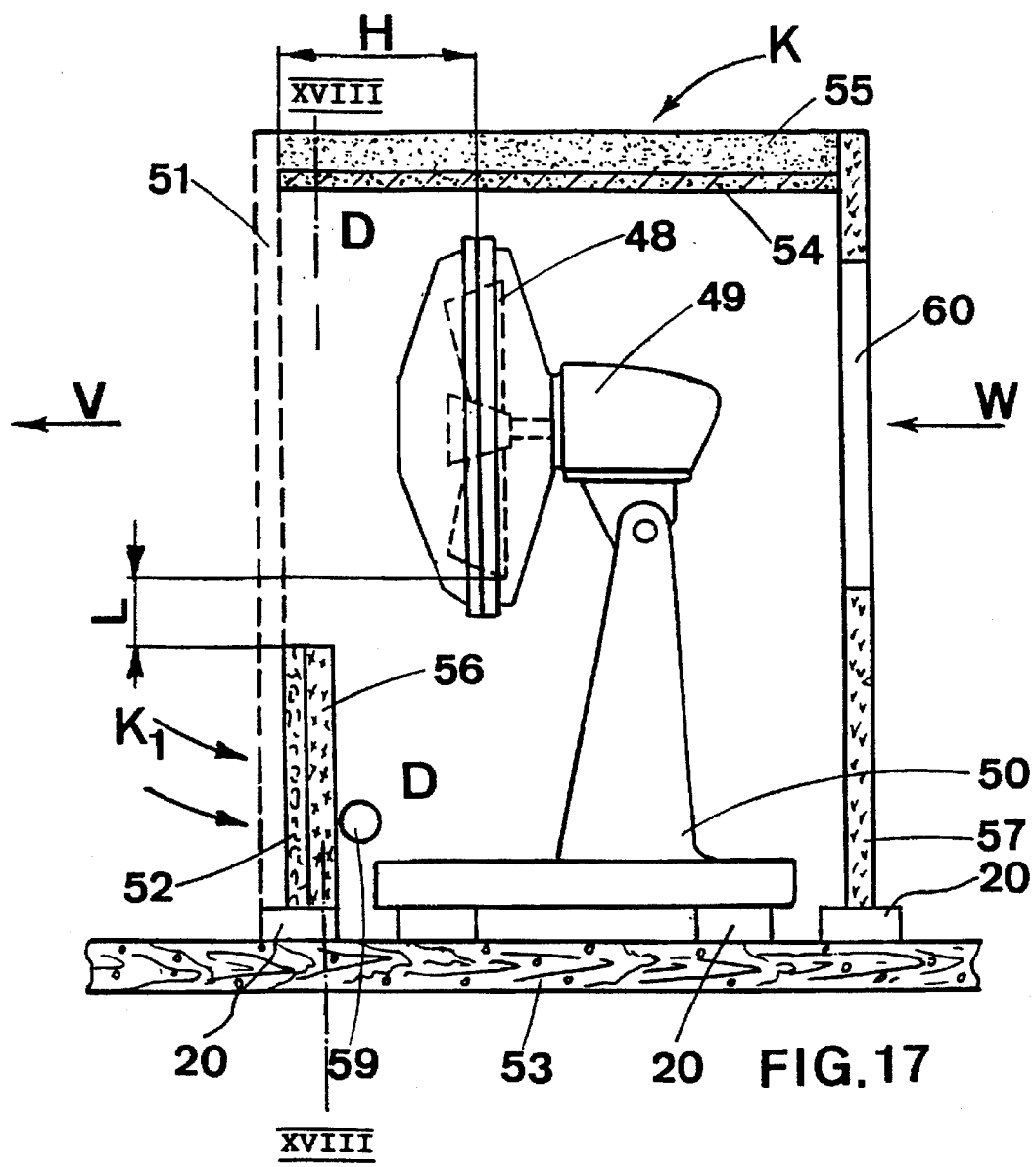
FIG. 17 is an air filter looking like "a house", made completely from the filtering materials in accordance with this invention.
Figure 18:
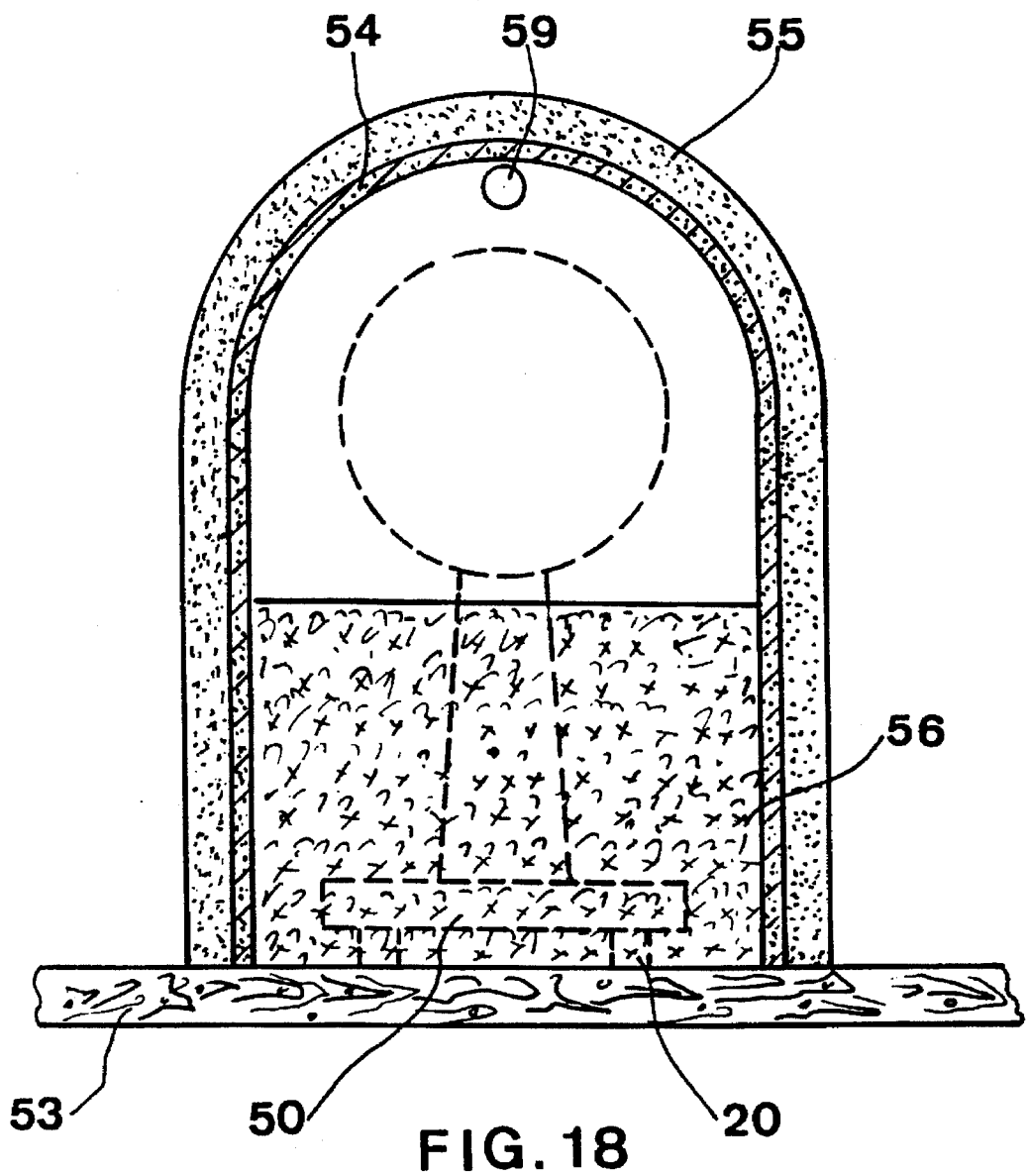
FIG. 18 is a view of cross-section along the line XVIII—XVIII of FIG. 17.

FIGS. 17 and 18 present a filter looking like a "house", made completely and only of filtering material. FIG. 18 presents a cross-section along XVIII—XVIII of FIG. 17. The back side of the "house" 57 is made of thin material, having a resistance 10–25 kg/m$^2$, and has a slot 60, which has dimension greater than the diameter of the blades 48 of the fan 50. The distinguishing feature of the presented filter is completely protected from vibration, as it never touches the fan 50 and stands on the massive foundation 53 (desk or floor). The other designations: 52, 54, 55, 56, are filtering materials for various usage. Changing the filtering materials one can communicate to the filter system (FIG. 17) different properties. For example, if to replace the filters 52 and 56 by the air filter of high efficiency (HEPA filter), and to replace the filter 55 by the tissue filter with the air stream resistance of 1–2 inches of water (out of basic air stream it is possible to put high-resistant filtering elements), and to change the filter 54 with the activated carbon thus the filter on FIG. 17 will work the following way: after the motor 49 and the blades 48 start working, the basic air stream in a turbulent regime will enter along the arrow W, passes slot 60 and the pre-filter 57, passes further the net 51 and comes out along the arrows V. The velocity of the air stream correspondingly will decrease the pressure in the zones D below atmospheric, and as a result, the polluted air of the room will pass through the filters 52, 54, 55 and 56 along the arrows K and $K_1$. The laminar filtering regime provide the most duration of contact between the air and the filter elements which increase air purifying effectiveness of filter.

Filter 54 on FIG. 17 blocks also TB-bacteria and other germs, and as the Table 3 shows, blocks well against the lead-based paint.

FIG. 17 shows the originality of the suggested invention: at first sight, it seems that when the blades 48 of fan 50 work, the air has to pass not along the arrows $K_1$, but in opposite direction. Actually, according to the said principle of Bernoulli, the air will pass through the filters 52 and 56 along the arrows $K_1$. The FIGS. 59 show the area of the ultraviolet lamp, which can easily be installed inside the filter or near it in case of necessity and which can easily kill TB-bacteria.

In cases, wherein the massive support 53 undergoes vibration, it is necessary to install the fan and the filter looking like a "house" upon a vibration isolator unit made, for example, from VELCRO fasteners.

The most preferable usage of the present invention, talking about the soldiers which lived in the conditions where the sand storm occur frequently in arid regions and where many various and dangerous fine particles have been concentrated in the air, there is a simultaneous work of the air filter designed for air conditioner (FIG. 9), air filtration apparatus, equipped with a ceiling fan (FIGS. 10–12) and an air filter looking like a "house" (FIG. 17).

The results of tests of the Air Filtering Systems are given in Table 3

TABLE 3

RESULTS OF TESTS OF AIR FILTERING SYSTEM
The room is 12' × 15' with 8' ceiling (1440 cubic feet = 40 m$^3$)

| Indoor air polluants 1 | Maximum contaminant level set by EPA 2 | Challenge (before air filtering) 3 | Result (after air filtering) Air Filters and Fan Types | | | | |
|---|---|---|---|---|---|---|---|
| | | | FIG. 17 16" Fan | FIG. 17 16" Fan | FIG. 7 16" Fan | FIG. 17 16" Fan | FIG. 7 16" Fan |
| Lead (lead-paint dust) | 0.2 mg/m$^3$ (8 hr) | 2.5 mg/m$^3$ | 0.02 mg/m$^3$ | 0.02 mg/m$^3$ | 0.1 mg/m$^3$ | 0.02 mg/m$^3$ | 0.1 mg/m$^3$ |
| Dust (mixture of lint, soot, asbestos, hair, etc. | 260 mg/m$^3$ (24 hr) | 400 mg/m$^3$ (24 hr) | 15 mg/m$^3$ | 5 mg/m$^3$ | 20 mg/m$^3$ | 15 mg./m$^3$ | 20 mg/m$^3$ |

The calculation related to selection of the appropriate filter, based on the method, described in present invention, which consist to set filter material around the surface of air stream, at the definite distance (see FIG. 2, filter 8), prove that the nature of provided air stream, passed through the filter media, is laminar (100 ft/min or less). As a result, the efficiency of filtration considerably increases and vibration of filter decreases, because the turbulent air motion is absent.

For damping mechanical vibration of the filter media, the soft nap fasteners (hook and loop fasteners) are used in accordance with present invention. The hooks and loops separate the filter from sources of vibration. It is new application of known fasteners, which, in combination with inexpensive filter, proposed in this invention, provide the new filtering device, which can be attached to any unit having working fan inside (there are more than 700 million such units in America) and which does not require opening of the cabinet to install internal components.

The invention is also a filter device which diminish the air born contamination but don't reduce the rate and volume of air flow entering into an enclosed area and don't reduce the cooling effect because the invented air filter is placed around the air stream and does not block it.

What is claimed is:

1. A method of filtering dust from air within an enclosed space comprising:

providing a fan having blades within said enclosed space, operating said fan to create a primary airflow through either a round or rectangular slot, said primary airflow having a velocity within the turbulent regime, said slot having a radius R, when round or an equivalent radius Re=0.565√F (where F is the area of a rectangular slot), positioning filter media beyond the periphery of said slot, said filter media having a width H measured in a direction parallel to the primary airflow axis, said filter media being placed at a distance L beyond the periphery of said fan blades, L being measured perpendicularly to the primary airflow axis, where L=0.26(H), and attaching the filter media to either a stationary element of the enclosed space or to a stationary element of said fan by way of at least one vibration isolation unit thereby isolating the filter media from any mechanical vibration caused by operation of the fan, whereby the filter media is positioned beyond the primary turbulent airflow and a secondary airflow having a velocity within the laminar regime passes through the filter media thereby filtering dust from the laminar airflow.

2. The method of claim 1, wherein said distance L cannot be more than 2R or 2Re.

3. The method of claim 1, wherein the at least one vibration isolation unit comprises hook and loop fasteners.

4. The method of claim 1, wherein additional filter media is positioned within the boundary of the primary airflow defined by the slot, said additional filter media being located at a distance of 6 to 30 cm along the axis of the primary airflow from the fan blades, such that upon reaching the additional filter media the primary airflow is substantially within the laminar regime, attaching the additional filter media to either a stationary element of the enclosed space or to a stationary element of said fan by way of at least one vibration isolation unit.

5. The method of claim 1, wherein the radius R of the round slot is equal to the radius of the fan blades.

6. The method of claim 1, further comprising placing UV-lamps adjacent to the filter media, such that bacteria are killed during operation.

7. A method of filtering dust from air within a room having a ceiling comprising:

providing a ceiling fan having blades radiating outward from a single central axis, said ceiling fan being hung from said ceiling at a point on said central axis, rotating said fan blades to create an airflow along said axis, positioning a filter material having a perforated membrane covering between the ceiling and the blades of the fan, said filter material being attached to the ceiling by way of at least one vibration isolation unit, said filter material and said at least one vibration isolation unit being spaced away from contact with any portion of the ceiling fan thereby isolating the filter media from any mechanical vibration caused by operation of the fan, whereby airflow having a velocity within the laminar regime passes through the filter media thereby filtering dust from the laminar airflow.

8. The method of claim 7, wherein the perforated membrane covering comprises apertures having a free area in the range of from about 5% to 15% of the effective area of the membrane.

* * * * *